Oct. 13, 1959  A. Y. LANPHIER  2,908,393
OIL SEPARATOR RAFT
Filed Aug. 20, 1954
2 Sheets-Sheet 1
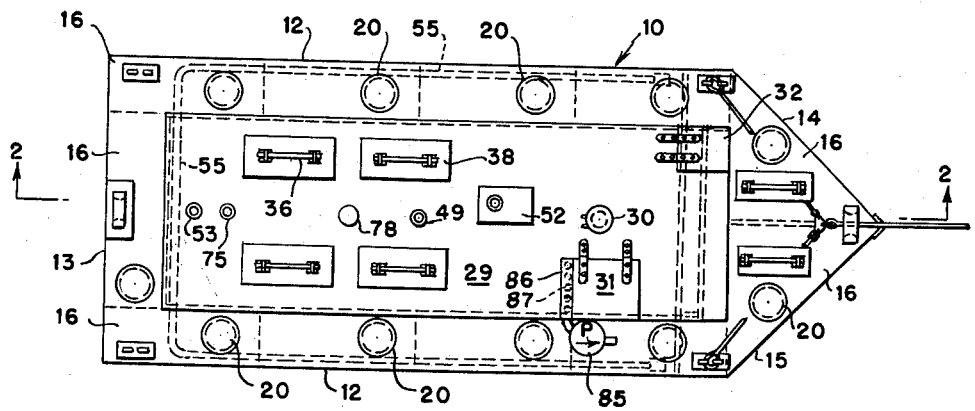
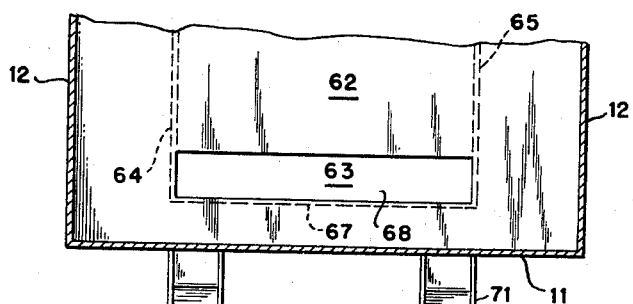
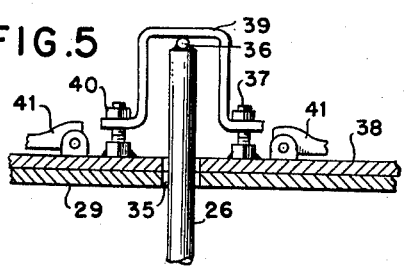
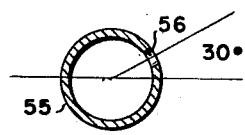
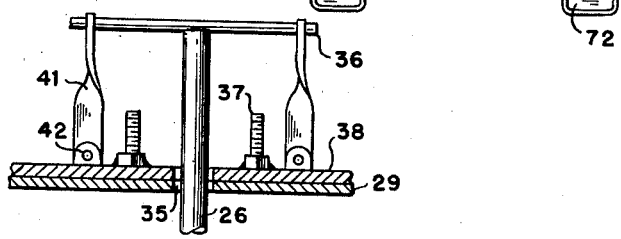
INVENTOR.
Alfred Y. Lanphier
BY
ATTORNEYS

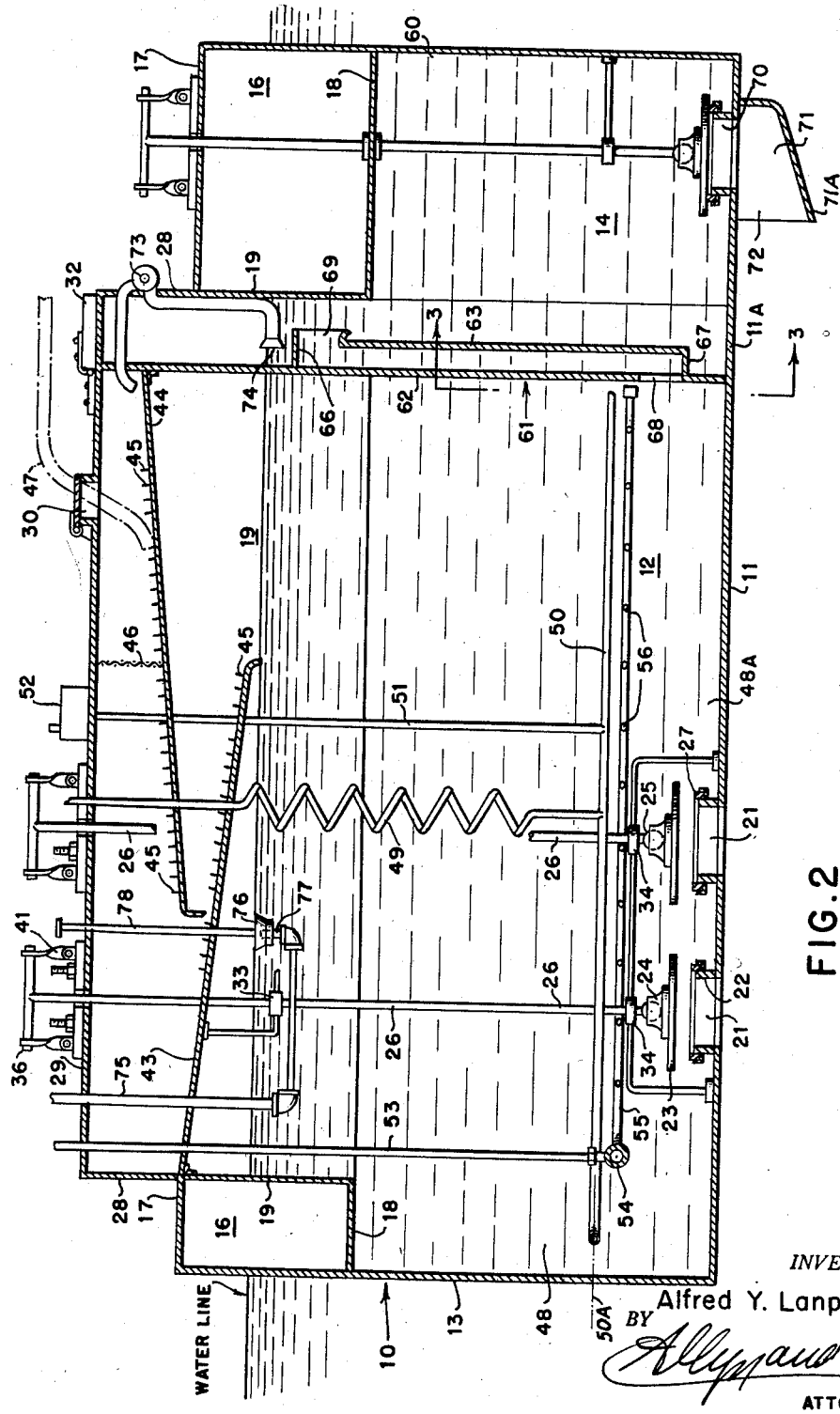

United States Patent Office 2,908,393
Patented Oct. 13, 1959

2,908,393

OIL SEPARATOR RAFT

Alfred Y. Lanphier, New York, N.Y.

Application August 20, 1954, Serial No. 451,144

7 Claims. (Cl. 210—242)

The present invention relates to oil salvage rafts and refers more particularly to certain constructional details in vessels of this type.

The oil separator raft has been developed in order to salvage substantial quantities of fuel oil which are found in oil tank cleaning slops, oily ballast water or water contaminated oil cargoes. Whatever its outer shape, the raft is characterized by a tank to hold mixed oil and water, and by buoyancy cells which keep the raft afloat. The main tank has controllable and normally open openings in its bottom, and as the mixture is pumped into the tank from above, the oil will float and the water will pass out the bottom opening.

As the salvaged oil is to be used as fuel oil, it is essential that water and solid objects be removed therefrom as quickly as possible and the provision of means for such removal is a principal object of the present invention. Such means is further combined with baffle plates preventing turbulence of the mixture and thus assisting separation, said plates further having novel additional means for promoting separation.

A disadvantage in operating such a raft is the time required for the oil and water to separate, also the difficulty in handling the oil unless the mixture is subjected to substantial heat. I have found that the addition to the heavy oil, from the bottom of the tank, of a small quantity of diesel fuel oil, well dispersed through the heavy oil, facilitates subsequent handling of the oil. Providing the supply and dispersing system for the diesel oil is therefore a further object of the present invention.

Another object is the provision of means to prevent "spitting." This occurs when the bottom of the tank is so full of sludge and scale that as more mixture comes in at the top, some sludge may be swept through the bottom. This not only defeats the purpose of the operation, but subjects the raft to involvement with authorities charged with preventing water pollution.

Sometimes the prevention of pollution is the paramount consideration, as it is a duty imposed by law and thus applicable even when the value of the oil recovered is less than the cost of the operation. For instance, cleaning slops contain a very high proportion of sludge, rust and scale. Ballast water, particularly where full ballast has been taken on to make the ship more manageable in rough weather, may contain one percent or less of oil. Use of the raft for such purposes is primarily justified by the prevention of the nuisance rather than by the value of oil recovered.

A further object is the provision of improved means whereby almost all the separated oil may be pumped out of the raft rapidly and the small remainder, which would otherwise be lost, may be skimmed off more slowly.

In accomplishing the objects of the present invention, slightly inclined plates are provided near the top of the tank, and a substantially vertical screen is provided above the top plate and in contact therewith. The mixture is pumped through a manhole in the top deck and onto the top plate, strained through the screen, passed to the lower plate and from there drips to the body of liquid in the tank with minimum turbulence. The plates are provided with upstanding wires around which the mixture must flow, and these wires and the screen both materially aid in separation.

Diesel oil is pumped to a U-shaped tube, the arms of the U lying close to the sides of the tank and extending the length thereof. The tube is adjacent the tank bottom, just below the heating pipes, the tube and pipes being immersed in the body of liquid. The tube is perforated throughout and the light oil is therefore evenly distributed throughout the body of the heavier fuel oil to render the same less viscous and of lesser specific gravity, so that separation takes place with less need of assistance by heat.

"Spitting" is prevented by a double wall dividing the tank into a smaller forward compartment and the main tank. The rear member of the double wall is apertured near its bottom and the forward member is apertured near its top. When it is known that the main tank is approaching a condition in which there is danger of "spitting," the openings in its bottom are closed. As more mixture is thereafter added to the top of the main tank, liquid will pass into the double wall and thence into the forward compartment. The forward compartment also has one or more openings in its bottom, through which water goes out as liquid enters from the double wall. Any oil in the entering liquid is skimmed off by a pump operating at surface level, and is returned to the main tank. The bottom openings of the forward compartment are shielded by hoods, extending downwardly from the raft's bottom, and surrounding the openings and open rearwardly. These hoods prevent stirring up oil or muck on the harbor bottom by the water flowing out of the bottom openings at high velocity which if directed straight down in shallow water would be apt to stir up oily bottom deposits.

Complete salvage of all the oil in the raft is provided by a rigid J-shaped oil exhaust pipe submerged in the oil and having the short end of the J as an upward facing inlet, the pipe being connected to a pump. The inlet has a bell shaped mouth vertically slidable on the pipe. The mouth is substantially submerged during most of the pumping and is raised substantially to the surface for skimming the last oil off the surface of the water rising in the main well as the oil is pumped out.

The invention accordingly consists in the features of construction, combinations of elements and arrangements of parts which will be exemplified in the constructions hereinafter described. In the accompanying drawing, in which are shown two of the various possible illustrative embodiments of this invention:

Figure 1 is a plan view of the raft embodying my invention.

Figure 2 is a section on the line 2—2 of Figure 1.

Figure 3 is a section on the line 3—3 of Figure 2.

Figure 4 is a fragmentary side view, partly in section, of the cover plate rod hold up apparatus.

Figure 5 is a fragmentary side view, partly in section, of the cover plate rod hold down apparatus.

Figure 6 is a side elevation of a modified form of connection between cover plate and cover plate rod.

Figure 7 is a vertical lateral sectional view of the diesel oil distributor pipe.

Referring now in detail to the drawings, the raft 10 is of conventional welded metal plate construction, and has a substantially flat and horizontal bottom wall 11, and substantially flat and vertical side walls 12 and stern wall 13. Port and starboard bow walls 14, 15, are likewise substantially flat and vertical, and form approximately a right angle one with the other.

Eleven buoyancy cells 16 are located inside the hull, and constituted by portions of the said side walls 12, 13, 14, 15, top and bottom walls 17, 18 and interior wall 19. A manhole 20 gives access to the interior of each cell 16.

Four circular openings 21 are formed in bottom wall 11, surrounded by collars 22 according to the teaching of Vorenkamp Patent No. 2,402,790. Cover plates 23 have ball sockets 24 engaging balls 25 on the lower ends of rods 26, and engage the resilient gaskets 27 surrounding collars 22 to close the openings 21.

Interior walls 19 are extended above upper walls 17 to provide a coaming 28 decked over by a top deck 29. Deck 29 is provided with a manhole 30 and hatches 31, 32.

Rods 26 are journaled in pillow blocks 33, 34 and extend through holes 35 in deck 29 and have the firmly mounted cross bars 36 at their top ends. Threaded studs 37 extend upwardly from plates 38 on deck 29 and on opposite sides of holes 35. A yoke 39 may be placed over rod 26 and studs 37 and tightened down by nuts 40, as in Figure 5, to force cover plates 23 against gaskets 27 to firmly close the openings 21.

Rods 26 may be held in elevated position, as in Figures 1, 2 and 4, by a pair of swivel arms 41 cooperating with each cross bar 36. Arms 41 are formed from flat stock which has been twisted a quarter turn, and are mounted at their lower ends on the pivots 42. Their upper ends are formed with upward facing recesses in which the cross bars 36 rest as shown in Figure 4. To lower the rods 26, the cross bars 36 are manually lifted free of arms 41 and the latter are swiveled down and out as illustrated in Figure 5, after which rod 26 and cross bar 36 are revolved a quarter turn and the yoke and nuts are applied to hold them down.

The baffle plates 43, 44 are slightly inclined from horizontal and are provided on their upper surface with a multiplicity of upstanding short rods 45 extending substantially perpendicularly upwardly from the plates. Rods 45 may be formed of weld wire or other preferred material, and are approximately three inches long and set six inches apart in rows, the rows further being six inches apart and the rods of one row staggered relative to those of the next row. Plate 44 leads gradually downward to plate 43, the latter leading gradually downward to liquid level in well 48A.

A substantially vertical screen 46 extends from upper deck 29 to plate 44 and in contact with the latter.

The cover of manhole 30 is opened and a hose 47 is entered therein to deliver the mixed or emulsified oil and water to plate 44. The oil and water passes against and around the rods 45, through the screen 46, to plate 43, where it must again pass against and around rods 45 before dripping with minimum turbulence into the body of liquid in the main well 48A of tank 48. Manhole 30 thus provides access for hose 47 to the tank interior, and also for personnel to inspect or repair plates 43, 44, or to remove debris collected by the screen 46.

The rods 45 and screen 46 aid in separation of the oil and water where the two have become emulsified. Whether the emulsion consists of beads of water surrounded by walls of oil or vice versa, the passage of the body of fairly viscous liquid against and around the rods 45 and through screen 46 tends to rupture the walls of the vehicle substance surrounding the beads, freeing the two to unite into larger bodies, thus breaking the emulsion and facilitating subsequent complete separation.

A steam supply helical coil 49 feeds the steam pipe 50, the latter having a number of parallel courses extending back and forth the length of the main well 48, and exhausting through pipe 51 into steam trap 52. The vertical coil 49 causes a central column of heated oil to induce circulation in the entire oil well and materially lessens the amount of steam and time needed to heat the oil in the main well.

It should be noted that because both the top and bottom of the raft are normally open, any steam generated by the water in the oil when heated to 212° F. or above, cannot cause an explosion or an oil blowout as can occur in conventional oil tanks.

I have found that a reduction in the viscosity and specific gravity of the oil in well 48A which greatly promotes separation and facilitates subsequent handling, is possible through adding to the body of the liquid a small amount of diesel fuel oil. The latter oil is known to have a much lower viscosity and specific gravity than the "Bunker C" fuel oil of ocean going ships, the separation of which from water is the function of the raft. The proportion of diesel oil to be added is approximately two percent by volume, when the addition is carried out by the following means.

The diesel oil supply pipe 53 extends from above deck 29, through the body of liquid to union 54 to the U-shaped tube 55, the latter being standard one and one quarter inch pipe perforated by quarter inch holes 56 spaced two feet part throughout the arms and bight of the U. Tube 55 extends across the stern and along the sides of well 48A, being closely adjacent the walls 12, and the holes 56 face inboard and upward at an inclination of substantially thirty degrees to horizontal.

When enough mixture has been pumped into well 48A, so that the underlying water therein is down to approximately the level of the steam pipe 50, as shown by the line 50A, steam is started through coil 49 and pipe 50 and the diesel oil is simultaneously pumped out of holes 56. The holes 56 pointing inboard and upwardly at thirty degrees from horizontal, the diesel oil at first assumes the form of a layer underlying the Bunker C oil. However a thermo siphon effect is present throughout the sinuous length of pipe 50, and furthermore the vertical helical coil 49 creates a more or less central column of ascending warmer oil, and the diesel oil is soon uniformly dissolved into the body of the heavier oil, substantially reducing its viscosity and specific gravity, so that it more readily separates from the remaining water dispersed throughout it.

With the mixture separated into distinct strata of oil, water and sludge, with the oil on top, the water in the middle and the sludge on the bottom, due to the differences in the specific gravity of the substances of the respective strata, it is well to recall that the openings 21, 70, are normally open, that the addition of mixture has forced water out of said openings, and that the withdrawal of oil will cause an equal weight of water to enter the openings. The body of oil therefore, regardless of its depth at any given moment, will always extend downwardly from the top surface of the liquid. Novel means are provided for the withdrawal of said body of oil.

Main well 48A is emptied of separated oil by a pump, not shown, connected to the rigid oil exhaust pipe 75 which is substantially J-shaped, extending downward from deck 29 inside well 48A, below the surface of the liquid, and having a bell shaped mouth 76 which surrounds and is vertically slidable on the submerged, short, upwardly open inlet end section 77 of pipe 75, being actuated by the control rod 78 whose upper end extends above deck 29.

Bell mouth 76 is kept about six inches below liquid level while most of the oil is pumped out, and when the water level reaches mouth 76, the latter may be raised substantially to surface level while the remaining oil is skimmed off by pumping more slowly. In this way sixty or eighty barrels of oil which would otherwise be lost is saved out of a total capacity of about twelve hundred barrels in the raft as presently constructed.

The following means are provided to prevent "spitting." Tank 48, in addition to main well 48A, comprises the forward scavenging compartment 60 separated from well 48A by the double walled partition 61 constituted by the rear wall 62 extending from bottom wall 11 to top deck 29, the forward wall 63, side walls 64, 65 and top and bottom walls 66, 67. As best seen in Figure 3, rear wall 62 further extends the full width of the raft between side walls 12, while forward wall 63 is of lesser width, being equal in width to aperture 68 located adjacent bottom wall 11 of the raft. Side walls 64, 65 of partition 61 bound the aperture 68 on either side and bottom wall 67 of partition 61 bounds aperture 68 on the bottom and forwardly thereof. Aperture 69 is located in front wall 63 at the top thereof and extends between side walls 64, 65.

Further "anti-spitting" means include two openings 70 in bottom wall 11A of compartment 60, said openings being fitted with collars, cover plates, etc. for operation in all respects similar to the openings 21 of main well 48A. Extending downwardly from the bottom surface of wall 11A and raft 10 and surrounding the openings 70 are the scoop shaped hoods 71 formed with openings 72 facing the stern. Hoods 71 further have the bottom walls 71A underlying and in spaced relation to the openings 70 and thus interposed in the path of the jet of water issuing from said openings as described hereafter. A pump 73 has its inlet 74 located at the surface level of liquid in compartment 60 and discharges through wall 62 to the top end of baffle plate 44 in main well 48A. The latter further has the sampling pump 85 connected by a manifold 86 to a plurality of pipes 87 extending to graduated depths in well 48A. By drawing samples from the various pipes the crew can tell the depth of oil or emulsion in well 48A.

As noted above, "spitting" is the ejection of sludge or scale from a bottom opening 21 or 70 of the raft and is to be avoided. In order to avoid such, the openings 21 are closed when it is known that the depth of sludge on bottom wall 11 exceeds the height of collars 22 so as to create danger of some being forced out of openings 21 by further filling of well 48A with liquid.

When openings 21 have been closed, if filling of the raft is to continue, openings 70 are opened. Openings 70 may be open or closed during the early stages of filling oil and water into well 48A, it merely being necessary to open the openings 70 after openings 21 are closed and if filling is to continue. With openings 21 closed and openings 70 open, further filling of well 48A will force water or emulsion or oil, whichever is adjacent aperture 68, into the partition 61 and out aperture 69 into scavenging compartment 60. It is understood that with at least one bottom opening of raft 10 open, the level of liquid both in well 48A and compartment 60 will be substantially the same as the water level outside the raft, the well 48A and compartment 60 being parts of tank 48 in communication with each other through the apertured partition 61. The difference in top level of oil in the raft from the level of water outside the raft varies constantly in proportion to the amount of oil in the raft and the specific gravity of the oil. It being evident that when the raft is full of water, as at the beginning of operation, the level of water will be the same inside and outside, it follows that the addition of a given volume of a liquid of less specific gravity than water will force out of the bottom opening a smaller volume of water, resulting in a higher liquid level in the raft. Accordingly, if the well 48A is full of Bunker C oil down to line 50A, the top level of oil will be about eight inches above the outside water level. In practical operation the same volume of oil of less specific gravity results in an oil level in well 48A approximately fourteen inches above the level of the outside water.

Sludge and scale being heavy, will not travel upward in partition 61, but will stay on bottom wall 11 in well 48A.

Pump 73 then skims any oil or emulsion off the surface of liquid in compartment 60, sending it back to baffle plate 44 whence it joins the liquid in well 48A. Pump 73 being adjacent hatch 32, visual inspection of its inlet 74 may be availed of to regulate the operation, so as not to return water to well 48A.

It is obvious that with openings 21 closed and pump 73 skimming all oil off the surface of liquid in compartment 60, nothing but water can reach opening 70 and spitting is thereby prevented.

The hoods 71 deflect sternward the liquid leaving openings 70, thereby preventing stirring up bottom muck in shallow water. While such stirring up of muck is not really spitting, harbor authorities seeing the muck in the water may conclude that the raft has been spitting and may further apply penalties accordingly.

If the prevention of spitting is not important, all openings 21, 70 may be left open and oil and water filled into well 48A. Maximum oil capacity will thus be realized, and of course in such operation pump 73 would not be operated.

In Figure 6 is illustrated a cover plate 23A provided with an axially located bifurcated standard 23B extending upwardly therefrom and to which is pivotally connected the rod 26A by means of a bolt 26B passing through the flattened end of the rod and the arms of the standard. Such cover plate and rod, corresponding to plate 23 and rod 26, may be used with corresponding structure for the purpose of closing openings 21 or 70 in wall 11.

It will thus be seen that there is provided a device in which the several objects of this invention are achieved, and which is well adapted to meet the conditions of practical use. As various possible embodiments might be made of the above invention, and as various changes might be made in the embodiments above set forth, it is to be understood that all matter herein set forth or shown in the accompanying drawing is to be interpreted as illustrative and not in a limiting sense.

What is claimed is:

1. In an oil separator raft of the type having a normally submerged main tank and buoyancy cells operatively associated therewith, said tank having a bottom wall formed with openings and including cover plates for said openings and means controlling the position of said cover plates relative to said openings, the improvement comprising the combination with the above of a deck covering said tank, an inclined baffle plate in said tank below and adjacent said deck, and a screen above and in contact with said baffle plate, said deck further having a manhole above said baffle plate and screen and providing access for discharge of oil and water onto said baffle plate above said screen and said manhole further providing an access to the material collected by said screen.

2. In an oil salvage raft having buoyancy cells operatively associated therewith and a main well with normally open openings in the bottom thereof whereby liquid in said well has a surface level substantially the same as the outside water level, said well further having a deck covering the same, the improvement comprising the combination with the above of an oil exhaust pipe extending below liquid level in said well and having an upwardly open inlet, said pipe further comprising a mouth portion vertically slidable thereon and surrounding said inlet, said mouth portion having means connected thereto and extending therefrom to above said deck, said mouth being slidable by said means from a slightly submerged position for fast pumping to a position substantially at surface level for skimming off completely all oil from above the water in said well.

3. In an oil separator raft having a normally submerged main tank and buoyancy cells operatively associated therewith, said tank having a bottom wall formed with openings and including cover plates for said openings and means controlling the position of said cover plates relative to said openings, the improvement comprising the combination with the above of a deck covering said tank, an inclined baffle plate in said tank below and adjacent said deck, said deck having a manhole above said baffle plate and providing access for discharge of oil and water onto said baffle plate, and a supply pipe for comparatively light and less viscous oil to be added to the mixture for decreasing the specific gravity of the oil therein, said pipe extending adjacent the bottom of said tank substantially parallel and adjacent to the side walls of said tank, said pipe being formed with perforations through which said lighter oil enters the mixture.

4. In an oil separator raft having a normally submerged main tank and buoyancy cells operatively associated therewith, said tank having a bottom wall formed with openings and including cover plates for said openings and means controlling the position of said cover plates relative to said openings, the improvement comprising the combination with the above of a deck covering said tank, an inclined baffle plate in said tank below and adjacent said deck, said deck having a manhole above said baffle plate and providing access for discharge of oil and water onto said baffle plate, and a plurality of spaced rods carried by and projecting upwardly from the upper surface of the baffle plate, said rods serving to rupture beads of the vehicle substance and thus free the same to unite into larger bodies.

5. In an oil separator raft having a normally submerged main tank, said tank having a bottom wall formed with openings and including cover plates for said openings and means controlling the position of said cover plates relative to said openings, the improvement comprising the combination with the above of a deck covering said tank, an inclined baffle plate in said tank below and adjacent said deck, said deck having a manhole above said baffle plate and providing access for discharge of oil and water onto said baffle plate, a supply pipe for comparatively light and less viscous oil to be added to the mixture for decreasing the specific gravity of the oil therein, said pipe extending adjacent the bottom of said tank substantially parallel and adjacent to the side walls of said tank, said pipe being formed with perforations through which said lighter oil enters the mixture, and a plurality of spaced rods carried by and projecting upwardly from the upper surface of the baffle plate, said rods serving to rupture beads of the vehicle substance and thus free the same to unite into larger bodies.

6. An oil separator raft according to claim 5 including a screen above and in contact with said baffle plate, said screen being adapted to collect foreign material admitted through the manhole.

7. In an oil separator raft having a normally submerged main tank, said tank having a bottom wall formed with openings and including cover plates for said openings and means controlling the position of said cover plates relative to said openings, the improvement comprising the combination with the above of a deck covering said tank, an inclined baffle plate in said tank below and adjacent said deck, a screen above and in contact with said baffle plate, said deck further having a manhole above said baffle plate and screen and providing access for discharge of oil and water onto said baffle plate above said screen and said manhole further providing access to the material collected by said screen, a supply pipe for comparatively light and less viscous oil to be added to the mixture for decreasing the specific gravity of the oil therein, said pipe extending adjacent the bottom of said tank substantially parallel and adjacent to the side walls of said tank, said pipe being formed with perforations through which said lighter oil enters the mixture, and a plurality of spaced rods carried by and projecting upwardly from the upper surface of the baffle plate, said rods serving to rupture beads of the vehicle substance and thus free the same to unite into larger bodies.

References Cited in the file of this patent

UNITED STATES PATENTS

| | | |
|---|---|---|
| 933,891 | Curry | Sept. 14, 1909 |
| 1,072,398 | Langley | Sept. 2, 1913 |
| 1,188,267 | Girshefski et al. | June 20, 1916 |
| 1,285,931 | Cady | Nov. 26, 1918 |
| 1,406,950 | Fackert | Feb. 14, 1922 |
| 1,474,938 | Marsh | Nov. 20, 1923 |
| 1,530,078 | Haynes | Mar. 17, 1925 |
| 1,545,210 | Stewart | July 7, 1925 |
| 1,565,992 | Eddy | Dec. 15, 1925 |
| 1,612,557 | Weisgerber | Dec. 28, 1926 |
| 1,702,612 | Morse | Feb. 19, 1929 |
| 1,802,847 | Stolte | Apr. 28, 1931 |
| 2,047,989 | Woelflin | July 21, 1936 |
| 2,393,498 | Miller | Jan. 22, 1946 |
| 2,402,790 | Vorenkamp | June 25, 1946 |

FOREIGN PATENTS

| | | |
|---|---|---|
| 5,707 | Austria | Nov. 11, 1901 |
| 15,384 | Great Britain | June 28, 1897 |